United States Patent [19]

Haraikawa et al.

[11] 4,072,214
[45] Feb. 7, 1978

[54] DISC BRAKE WITH NON-DEFORMABLE YOKE

[75] Inventors: Tetsuo Haraikawa, Funabashi; Yasuo Karasudani, Yokohama, both of Japan

[73] Assignee: Tokico Ltd., Japan

[21] Appl. No.: 734,513

[22] Filed: Oct. 21, 1976

[30] Foreign Application Priority Data

Oct. 23, 1975   Japan ................................. 50-127763

[51] Int. Cl.² ............................................. F16D 55/18
[52] U.S. Cl. .................................. 188/72.4; 188/73.4; 188/73.6
[58] Field of Search ..................... 188/73.4, 73.6, 73.3, 188/72.4, 72.5, 205 A, 205 R, 72.3, 73.5

[56] References Cited

U.S. PATENT DOCUMENTS

| | | | |
|---|---|---|---|
| 3,365,030 | 1/1968 | Cochrane | 188/72.4 |
| 3,421,603 | 1/1969 | Schuchmann et al. | 188/72.4 |
| 3,658,160 | 4/1972 | Beller et al. | 188/73.4 |
| 3,773,149 | 11/1973 | Toshida et al. | 188/72.4 |

*Primary Examiner*—Trygve M. Blix
*Assistant Examiner*—Douglas C. Butler
*Attorney, Agent, or Firm*—Wenderoth, Lind & Ponack

[57] ABSTRACT

A disc brake has a bracket adapted to be secured to a non-rotatable part of a vehicle and straddling a rotatable disc for supporting a pair of friction pads in slidable relationship with the disc to receive braking torque, a housing disposed on one side of the disc and slidably supported for movement in the axial direction, a piston working in a cylinder formed in the housing and urging one of the friction pads against one surface of the disc, and a plate-like yoke straddling the disc and connecting the housing with the other friction pad. The plate-like yoke is secured to the housing with an interference fit at least in the circumferential direction of the disc.

7 Claims, 5 Drawing Figures

DISC BRAKE WITH NON-DEFORMABLE YOKE

This invention relates to a disc brake.

One type of prior art disc brake comprises a housing adapted to be secured to a non-rotatable part of a vehicle such as a wheel supporting member, and two pistons slidably fitted in a cylinder formed in the housing. The two pistons move in the opposite directions in applying the brake, and one of the pistons acts directly on one of friction pads which is disposed between the housing and a rotatable disc, and the other piston acts on the other friction pad through a plate-like yoke straddling the rotatable disc, whereby the two friction pads are urged against the opposite surfaces of the disc to effect braking action. The yoke is slidably supported on the housing for movement in the direction of the axis of the disc, and guide grooves are usually formed in the opposite side surfaces of the housing to receive the yoke. It is difficult to seal off the surfaces in sliding engagement against the intrusion of water, dust or the like, and when such materials get between the sliding surfaces, smooth sliding movement of the yoke is sometimes impeded.

In applying the brake, the yoke transmits a braking force or a clamping force to the other friction pad from the other piston, and a braking torque generated between the friction pad and the disc is received by the housing through the yoke, and this will tend to deform the yoke which sometimes will prevent smooth sliding movement of the yoke.

The pair of friction pads are usually slidably supported on a pair of pins extending axially between the housing and the yoke, and thus there is a problem that the friction pad will sometimes fall off the brake when one of the pins is not present or breaks. Further, it is necessary to provide spring means such as a plate spring for preventing rattling noise which complicates the construction and maintenance of the brake.

It has been proposed to provide a disc brake structure to solve the aforementioned problems, which disc brake structure comprises a bracket adapted to be secured to a non-rotatable part of a vehicle and straddling a rotatable disc, a housing disposed on one side of the disc and slidably supported by pin means on the bracket for movement in the direction parallel to the axis of the disc, a pair of friction pads opposing with one another with the disc therebetween, one of the friction pad being located between the housing and the disc, and the other pad being connected to the housing by a plate-like yoke straddling the disc.

The yoke acts simply to transmit the clamping force to the other friction pad. Thus, the strain on the yoke can be reduced substantially and it becomes possible to reduce the thickness of the plate-like yoke substantially.

The sliding portion between the housing and the bracket may comprise a pin secured to the bracket and a blind bore formed in the housing, which construction make it possible to arrange a protecting boot therebetween for sealing the sliding portion effectively against ingress of dust and the like.

The yoke in the proposed structure is formed such that opposing inner peripheral end portions of an opening formed in the yoke are fitted in axially extending grooves formed in the opposite sides of the housing with normal manufacturing clearance between the yoke and the groove surfaces.

In such arrangement however, we have found that the yoke deforms in the direction of the axis of the rotor when the brake is activated forcefully, which extends the stroke of a brake pedal and adversely affects the feeling of the brake pedal.

The present invention is directed to an improvement in the above-described proposed disc brake structure in which improvement, the inner peripheral end portions of the yoke are force fitted to the opposite sides of the housing.

These and other objects and effects of the present invention will become apparent from the following detailed description taken in conjunction with the accompanying drawings, in which.

Figure 1:
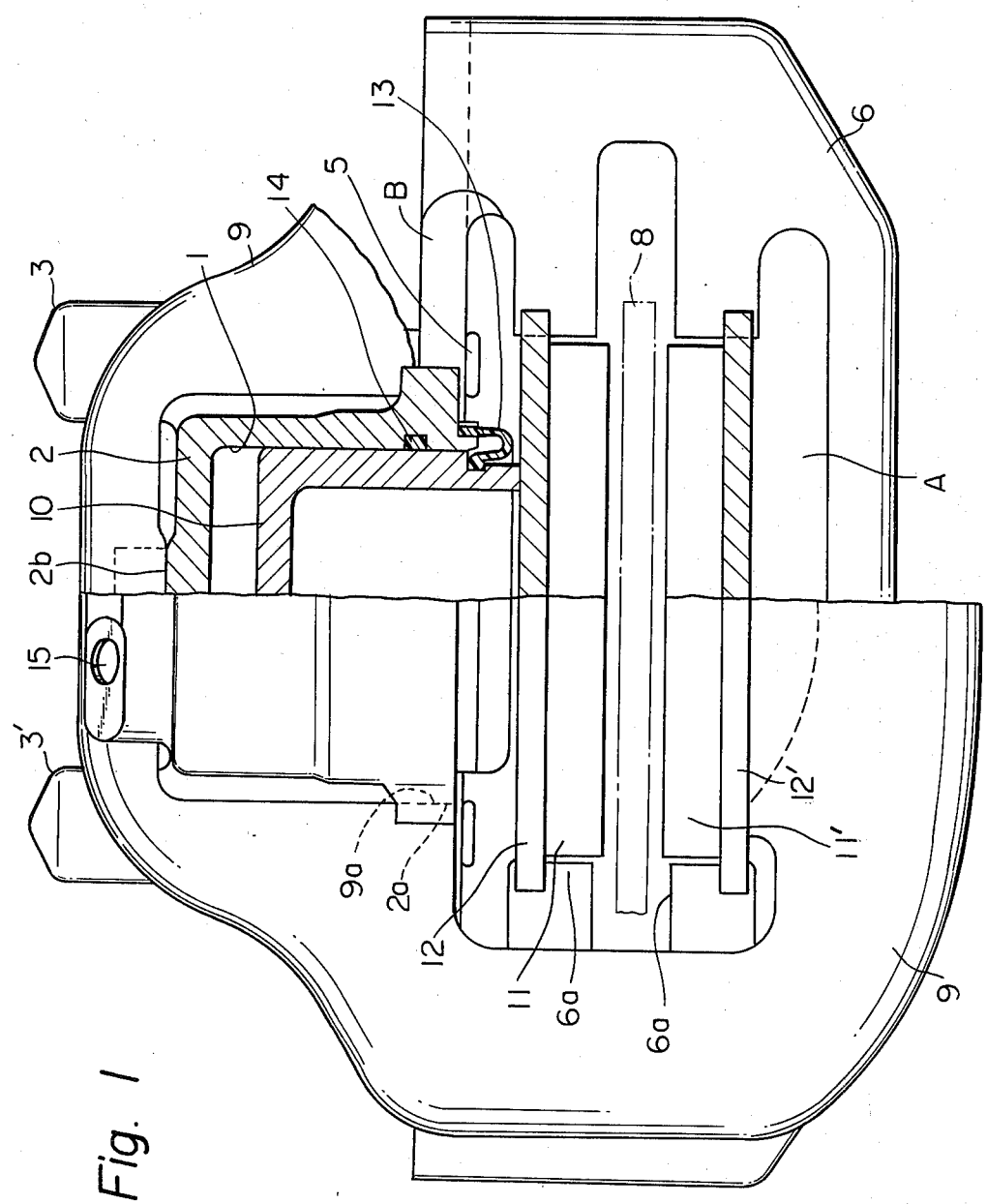
FIG. 1 is a composite plan view of a disc brake according to the present invention, with the right half thereof being shown as a partially broken away cross-section.
Figure 2:
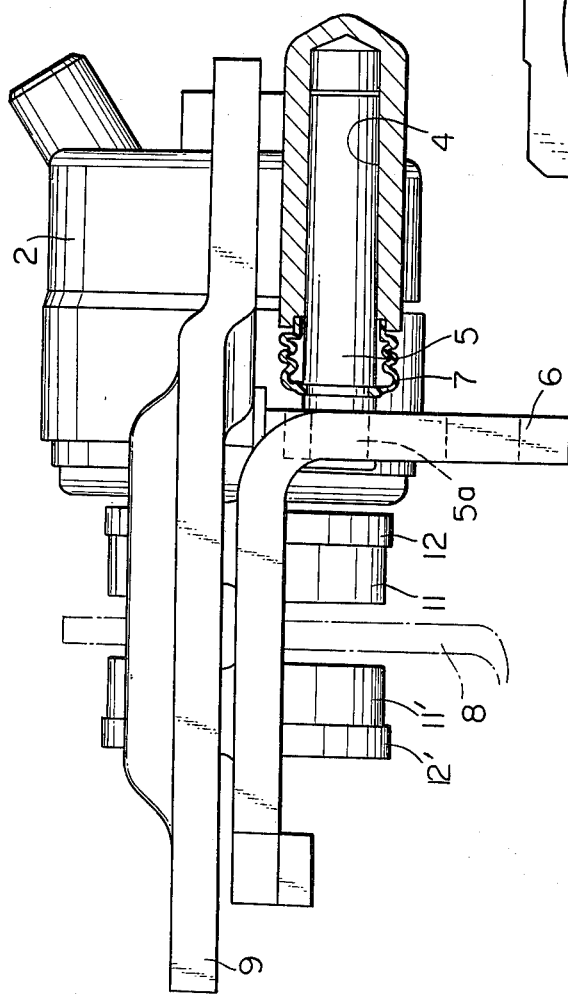
FIG. 2 is a composite end view of the disc brake of FIG. 1, wherein the bracket and the yoke are partially cut away in the right half in the drawing.
Figure 3:
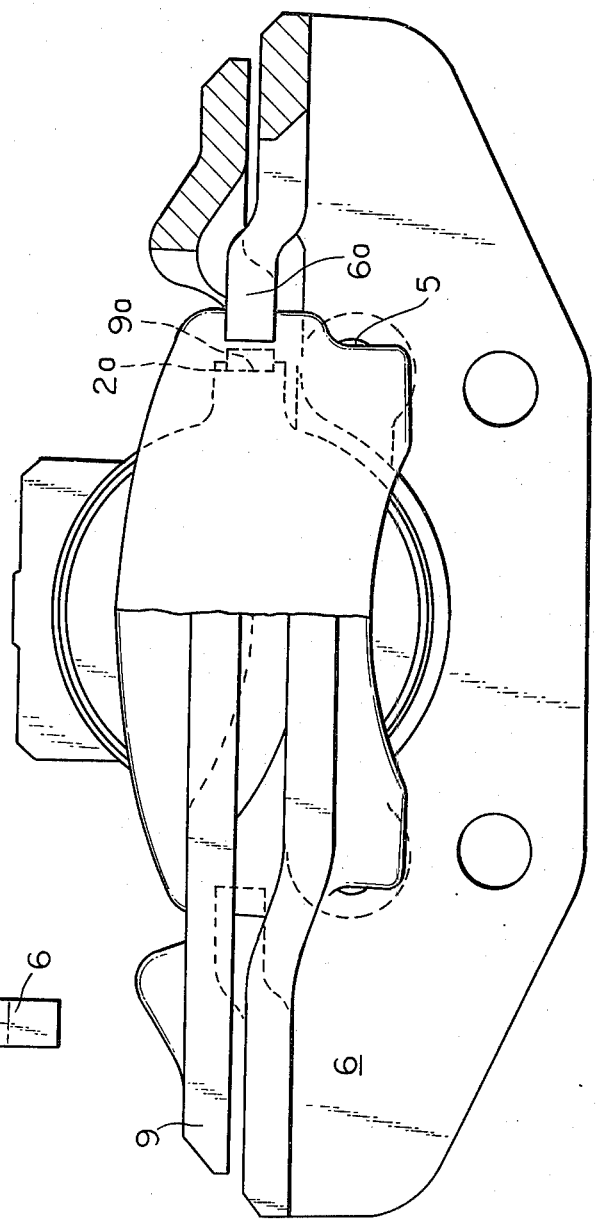
FIG. 3 is a partially broken away side view of the disc brake of FIGS. 1 and 2.

In FIGS. 1, 2 and 3, a housing 2 having a cylinder 1 therein has arms 3 and 3' integral therewith on the opposite sides thereof. The arms 3 and 3' are provided with guide bores (only one of which is shown at 4 in FIG. 2) which extend parallel to the direction of the axis of a rotatable disc 8. Each guide bore has a pin 5 slidable therein, and one end portion 5a of the pin 5 is secured to a bracket 6 by caulking or the like. The bracket 6 is adapted to be secured to a non-rotatable part (not shown) of a vehicle by means of bolt or the like. A protecting boot 7 seals the sliding surface on the pin 5 and the guide bore 4 from the outside to prevent ingress of water, dust or the like. The bracket 6 is a generally L-shaped member and one arm of which extends in the direction parallel to the axis of the disc and has a large opening for straddling a portion of the periphery of the rotatable disc 8.

A plate-like yoke 9 straddling a portion of the disc 8 in a position generally parallel to the one arm portion of the bracket 6 is mounted on the housing 2. A piston 10 is fitted slidably in the cylinder 1 of the housing 2 for moving toward and retracting from the disc 8. A pair of friction pads 11 and 11' are opposed to with one another with the disc 8 therebetween. The friction pads 11 and 11' are slidably supported on the bracket 6, the opposite side edges of backing plates 12 and 12' of the friction pads 11 and 11' having recesses therein slidably engaging the corresponding inner edges of opposed inwardly extending portions 6a of said one arm of the bracket 6. The rear surface of the backing plate 12 abuts the piston 10 and the rear surface of the backing plate 12' abuts the inner edge of the yoke 9. Shown at 13 is a boot for preventing ingress of water, dust or the like into the cylinder 1, and at 14 is a sealing ring disposed between the cylinder 1 and the piston 10. As shown in FIG. 1, the large opening formed in the one arm of the bracket 6 has two pair of opposed inwardly extending portions 6a for guiding the sliding movement of the friction pads, a space being provided between the portions 6a for receiving the disc 8 therein, and spaces A having a width larger than the thickness of the respective backing plates 12 and 12' are provided on the opposite sides of the portions 6a for allowing removal of the friction pads radially outwardly of the disc 8 when the friction pads are retracted sufficiently from the disc 8.

When oil under pressure is introduced into the cylinder 1 through a port 15, the piston 10 moves toward the disc 8 urging the friction pad 11 against one surface of the disc 8, and the housing 2 supported slidably on pins 5 on the bracket 6 moves in the direction opposite to the movement of the piston 10. The yoke 9 moves integrally with the housing 2 and urges the friction pad 12' against the other surface of the disc 8. Braking torque generated in the friction pads 11 and 12 is received directly by portions 6a of the bracket 6 and, thus, no force will act on the sliding portion consisting of the pins 5 and the guide bores 4.

Therefore, braking torque generated when applying the brake is not transmitted through the yoke and it becomes possible to reduce strain or deformation of the yoke which makes it possible to reduce the weight of the yoke substantially.

Figure 4:
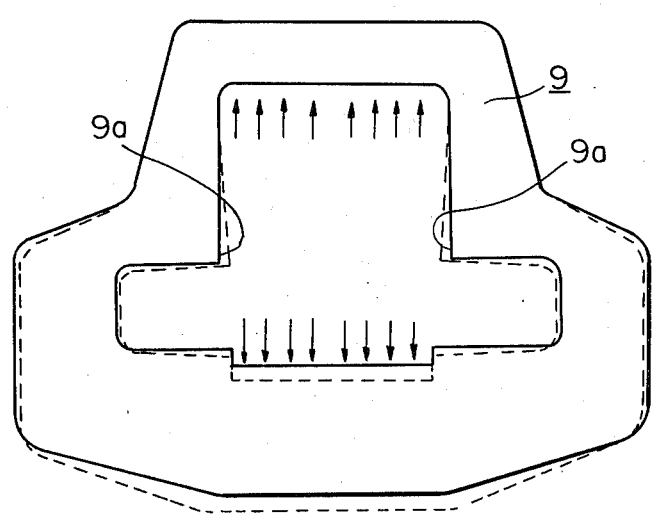
FIG. 4 is a schematic view showing deformation of the yoke during application of the brake.

In the construction shown in FIGS. 1 to 3 inclusive, the yoke 9 is mounted on the housing 2 with the inner peripheral edges 9a engaging with the grooves 2a formed in the opposite sides of the housing 2. When the edges 9a are fitted in the grooves 2a with a normal manufacturing tolerance, there is sometimes a relatively large clearance left between the groove 2a and the edge 9a. When a clearance is left in the direction of the circumference of the disc between the grooves 2a and the edges 9a and the brake is applied to urge the friction pads 11 and 11' against the disc the yoke 9 receives forces acting in the directions of the arrows as shown in FIG. 4 and tends to deform as shown in the broken line in the drawing, with the result that the stroke of the brake pedal increases and brake feeling is adversely affected. Further, such a clearance between the housing and the yoke will cause a rattling noise.

According to the present invention, the inner edges 9a of the yoke are fitted in the grooves 2a of the housing 2 with an interference fit in the direction of the circumference of the disc.

Figure 5:
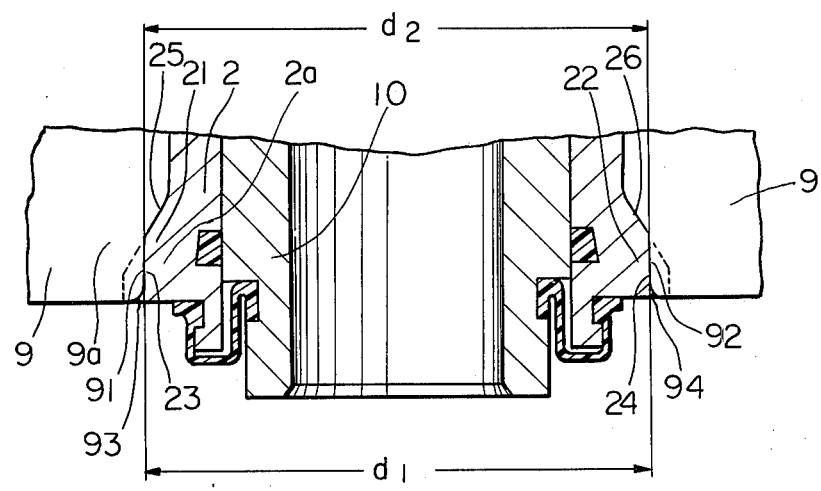
FIG. 5 is a partial cross-sectional view showing an essential portion of the present invention.

FIG. 5 is a detailed view showing the engaging portions of the housing and the yoke, in which, as shown at 21, 22, circumferentially extending lug portions integrally formed on the opposite sides of the housing 2 define grooves (the bottom surfaces of which are shown at 23 and 24 respectively) for receiving respective inner end portions (the inner peripheral surfaces of which are shown at 91 and 92 respectively) of the yoke 9. The distance $d_1$ between the surfaces 21 and 23 is larger than the distance $d_2$ between the surfaces 91 and 92. Preferably the value $d_1 - d_2$ (interference) is in a range of 0.1 - 0.3 mm.

Preferably, inclined surface portions 25 and 26 are formed on the lug portions 21 and 22 of the housing and rounded off portions 93 and 94 are formed on the tip end portions of the surfaces 91 and 92 for making possible an easy press fit operation.

If desired, the yoke can be secured to the housing by caulking or the like after the surfaces 91 and 92 are tightly fitted with the surfaces 23 and 24.

Thus the disadvantages described in conjunction with FIG. 4 can be prevented, and effective braking action can be performed and, further, an improved anti-vibration characteristic of the disc is obtained.

Having thus described our invention, it is obvious that various modifications may be made in the same without departing from the spirit of the invention, and, therefore, we do not wish to be understood as limiting ourselves to the exact form, construction, arrangement, and combination of parts herein shown and described.

What is claimed is:

1. A disc brake comprising a bracket for mounting on a non-rotatable part of a vehicle and straddling a rotatable disc, a pair of spaced opposed friction pads slidably mounted on said bracket for movement toward and away from opposite sides of said disc, a housing disposed on one side of the disc, pin means between said bracket and said housing for slidably supporting the housing for movement in a direction parallel to the axis of the disc, said housing having a cylinder therein, a piston in said cylinder engaging one of the friction pads for urging the one friction pad against one surface of the disc and a plate-like yoke straddling the disc and connecting the other friction pad disposed on the opposite side of the disc with the housing, the yoke engaging the housing with an interference fit at least along portions of the yoke extending between the other friction pad and the end of the housing remote from said friction pads.

2. A disc brake as claimed in claim 1, in which said plate-like yoke has an opening therein through which a portion of the periphery of the rotatable disc and a portion of the housing extend, said housing having axially extending grooves in the opposite sides thereof receiving the inner edge of the yoke around said opening with an interference fit between the yoke and the housing.

3. A disc brake as claimed in claim 1, in which said pin means is a pair of axially extending pins secured to the bracket said housing having corresponding guide bores in which said pins are slidably received.

4. A disc brake as claimed in claim 1, in which the bracket comprises a generally L-shaped member with an arm extending parallel to the axis of the disc and having an opening through which a portion of the periphery of the rotatable disc extends.

5. A disc brake as claimed in claim 4, in which said opening in the bracket has portions adjacent to the rear surface of each of the friction pads with lateral dimensions greater than the friction pads and a dimension parallel to the axis of the disc for allowing removal of the friction pads from the brake radially therethrough.

6. A disc brake as claimed in claim 5, in which said cylinder has an axial dimension allowing additional retracting movement of the piston toward the end wall of the cylinder.

7. A disc brake as claimed in claim 4, in which the bracket comprises a radial arm having said pin means secured thereon.

* * * * *